(12) United States Patent
Baker et al.

(10) Patent No.: US 7,492,456 B2
(45) Date of Patent: Feb. 17, 2009

(54) METHOD FOR OPERATING A COLOR MEASUREMENT SYSTEM

(75) Inventors: Douglas V. Baker, Middleville, MI (US); Mark A. Cargill, Belding, MI (US); Bernard J. Berg, Wayland, MI (US); Stephen B. Rankin, Tyngsboro, MA (US); James L. Mourey, Hopkinton, MA (US); Robert L. Winchester, Boxford, MA (US)

(73) Assignee: X-Rite, Inc., Grand Rapids, MI (US)

( * ) Notice: Subject to any disclaimer, the term of this patent is extended or adjusted under 35 U.S.C. 154(b) by 0 days.

(21) Appl. No.: 12/019,234

(22) Filed: Jan. 24, 2008

(65) Prior Publication Data

US 2008/0151242 A1 Jun. 26, 2008

Related U.S. Application Data

(62) Division of application No. 11/119,867, filed on May 2, 2005, now Pat. No. 7,345,763.

(60) Provisional application No. 60/566,813, filed on Apr. 30, 2004.

(51) Int. Cl.
*G01J 3/46* (2006.01)
*G01N 21/25* (2006.01)

(52) U.S. Cl. ........................ 356/402; 356/408

(58) Field of Classification Search .............. 356/402, 356/408, 425

See application file for complete search history.

(56) References Cited

U.S. PATENT DOCUMENTS

| 4,505,589 | A | * | 3/1985 | Ott et al. | 356/402 |
| 4,874,247 | A | * | 10/1989 | Watanabe et al. | 356/402 |
| 4,963,028 | A | * | 10/1990 | Braun et al. | 356/445 |
| 5,073,028 | A | * | 12/1991 | Bowden et al. | 356/402 |
| 5,986,769 | A | * | 11/1999 | Krzyminski | 356/445 |
| 6,732,917 | B1 | * | 5/2004 | Benz et al. | 235/379 |

FOREIGN PATENT DOCUMENTS

WO  WO01/57485 A1  8/2001

* cited by examiner

*Primary Examiner*—Roy M Punnoose
(74) *Attorney, Agent, or Firm*—McCarter & English, LLP

(57) ABSTRACT

A color measurement system includes a hand held color measurement instrument, which may be provided with a wireless interface to a computer. The color measurement system includes a scanning guide for holding the hand held color measurement instrument in proper alignment with a color target. The scanning guide includes a calibration reference to allow convenient calibration of the hand-held color measurement instrument. The hand-held color instrument includes an illumination ring to provide visual feedback to the user. The color of the illumination ring changes in order to display a color similar to that being read by the hand-held color measurement instrument. Color management profiling of the hand held color measurement instrument illumination ring improves the color rendition capability of the illumination ring.

14 Claims, 13 Drawing Sheets

| PATCH COLOR | VALUE | BINARY CONVERSION |
|---|---|---|
| WHITE | 0 | 000 |
| YELLOW | 1 | 001 |
| MAGENTA | 2 | 010 |
| RED | 3 | 011 |
| CYAN | 4 | 100 |
| GREEN | 5 | 101 |
| BLUE | 6 | 110 |
| BLACK | 7 | 111 |

METHOD FOR OPERATING A COLOR MEASUREMENT SYSTEM

RELATED APPLICATIONS

This patent application is a divisional application and claims the benefit of a commonly assigned, non-provisional U.S. patent application entitled "Method for Operating a Color Measurement System," filed May 2, 2005 and assigned Ser. No. 11/119,867, now U.S. Pat. No. 7,345,763 which non-provisional patent application claims the benefit of Provisional Patent Application No. 60/566,813, filed Apr. 30, 2004, and entitled "COLOR MEASUREMENT INSTRUMENT". This application incorporates by reference non-provisional U.S. patent application Ser. No. 11/119,866, filed on May 2, 2005, and entitled "Color Code for Color Measurement System" and non-provisional U.S. patent application Ser. No. 11/119,952, filed on May 2, 2005 and entitled "Color Measurement System".

BACKGROUND OF THE INVENTION

Color management products allow the creation of device characterization profiles for various input or output devices, such as printers. These profiles, such as ICC (International Color Consortium) compliant profiles, allow for proper color handling across many types of devices in digital workflow of computer images. For example, in order to create a printer profile, the printer creates a sheet of color patches arranged in a predetermined pattern. A spectrophotometer then scans the color patches. The absolute measurements made by the spectrophotometer comprise a set of data that characterizes the producible color gamut of the printing device, ink, and media combination; From this data set, a profile for the device is created. The device profile then may be used to insure uniform color display.

Recently, hand-held spectrophotometers have been developed for use in color management. The hand-held spectrophotometers are in many ways easier and more convenient to use than larger spectrophotometers. However, current hand-held spectrophotometers do have certain disadvantages.

In order to accurately, robustly, and rapidly measure a group of color patches, the movement over the color patches by the spectrophotometer must be associated with the individual color readings. A mechanical linear feedback mechanism such as a wheel is placed in contact with the color patches. As the spectrophotometer is moved, the wheel measures the speed and direction of such movement. Because the wheel is contact with the color patches, the wheel may distort the color patches, making the measurement by the spectrophotometer inaccurate. Additionally, the wheel, due to use or malfunction, may inaccurately measure the distance, and thereby causing faulty readings of the color patches resulting in re-scanning or a poor quality device profile.

Second, the hand-held spectrophotometer may be allowed to contact the sheet of color patches during the scan. The contact by the hand-held spectrophotometer may alter the visual appearance as well as the absolute color where the contact occurs, and thus result in inaccurate readings and a poor quality device profile. An example of such a device is the "EyeOne", manufactured by Gretag-Macbeth AG.

Third, the hand-held spectrophotometer must be tethered to a computer, usually by a serial or USB (Universal Serial Bus) cable. The information gathered by the spectrophotometer is sent to the computer by way of the USB cable. Thus, the length of the USB cable restricts the area where the spectrophotometer may be used. This is inconvenient, especially if the device being measured by the spectrophotometer is not located near the computer. Insufficient work surface around computer workstations, to adequately scan over a printed target without cord binding or scan influence and interference, also leads to inaccurate readings and a poor quality device profile.

An improved color measurement system that provides for more accurate color readings and can be used away from the computer is thus highly desirable.

SUMMARY OF THE INVENTION

In order to provide a compact, easily useable handheld color measurement instrument, the color measurement instrument is provided with an improved scanning guide system. To assist in maintaining alignment of the detector array with the color patches, the scanning guide is provided with a plateau that fits within a wide notch located on the base of the color measurement instrument. As the color measurement instrument is translated across the scanning guide, the interrelationship of the wide notch and the plateau maintain the location of the detector array in a proper orientation with respect to the color chart.

Additionally, the plateau includes a number of markings across its top. An optical linear position feedback sensor located in the base of the color measurement instrument uses the markings to determine the lateral movement of the color measurement instrument Thus, the color measurement instrument never comes into contact with the color chart, thereby minimizing the distortions to the color chart.

The scanning guide further includes a calibration reference conveniently integrated into the top of the scanning guide. A calibration plateau of the same general size as the wide notch in the base of the color measurement instrument is provided near the calibration strip. To calibrate the color measurement instrument, the wide notch is engaged with the calibration plateau, thus properly aligning the color measurement instrument detector array with the calibration strip, thereby enhancing the calibration of the color measurement instrument.

The scanning guide system may also include a vertical guide. The vertical guide allows the scanning guide to move accurately up and down on the color chart. The relationship of the color measurement instrument to the color patch groups is maintained, facilitating an accurate reading of the color patch groups that collectively comprise the test target.

The color measurement instrument is also provided with a communication port for attachment to a computer, The communication port could be any well-known interface. Optionally, the communication port could be a wireless interface.

If provided with a battery, the color measurement instrument could operate without a physical connection to a computer, thereby providing greater freedom and flexibility in using the color measurement instrument. When a color target is read, the data from the color target is stored in the color measurement instrument. If the color measurement instrument has a wireless interface, the color measurement instrument could then wirelessly transmit the information to a computer. Alternatively, the color measurement instrument could retain the data in memory and then download the information to the computer if the color measurement instrument was later physically connected to a computer by way of a cable or docking system.

The color measurement instrument could also be provided with an illumination ring. The illumination ring simulates the color currently being read by the color measurement instrument. The illumination ring, which may be composed of one or more multi-colored LED arrays, provides immediate feedback to a user as to the color patch currently being read by the color measurement instrument. Additional user interface information could be provided (human or remote camera viewable) by way of the illumination ring by using unique color and illumination techniques.

In order to further improve the capabilities of an un-tethered color measurement instrument system, the color target read by the color measurement instrument may be provided with a target identification strip. The target identification strip encodes information about the entire target such as the patches per color strip, the number of color strips on the target, the patch size, the gap size and the software used to create the target. The target identification strip also includes a checksum to insure data integrity.

Further, the color target could be provided with individual strip identification. The strip identification includes a color encoded start bit and a color encoded end bit. By providing unique start bits and end bits, the color strip can be accurately decoded regardless of the direction of the scanning of the strip. Further, indexing information relating to the strips which comprise a color target, is embedded and stored in the color measurement device memory. The ability of the color measurement device to relate this strip identification index with individual strips, provides for very easy recovery of errors such as an end user missing or duplicating measurement of particular strips.

These and other objects, advantages and features of the invention will be more readily understood and appreciated by reference to the detailed description of the drawings.

DETAILED DESCRIPTION OF THE DRAWINGS

Figure 1:
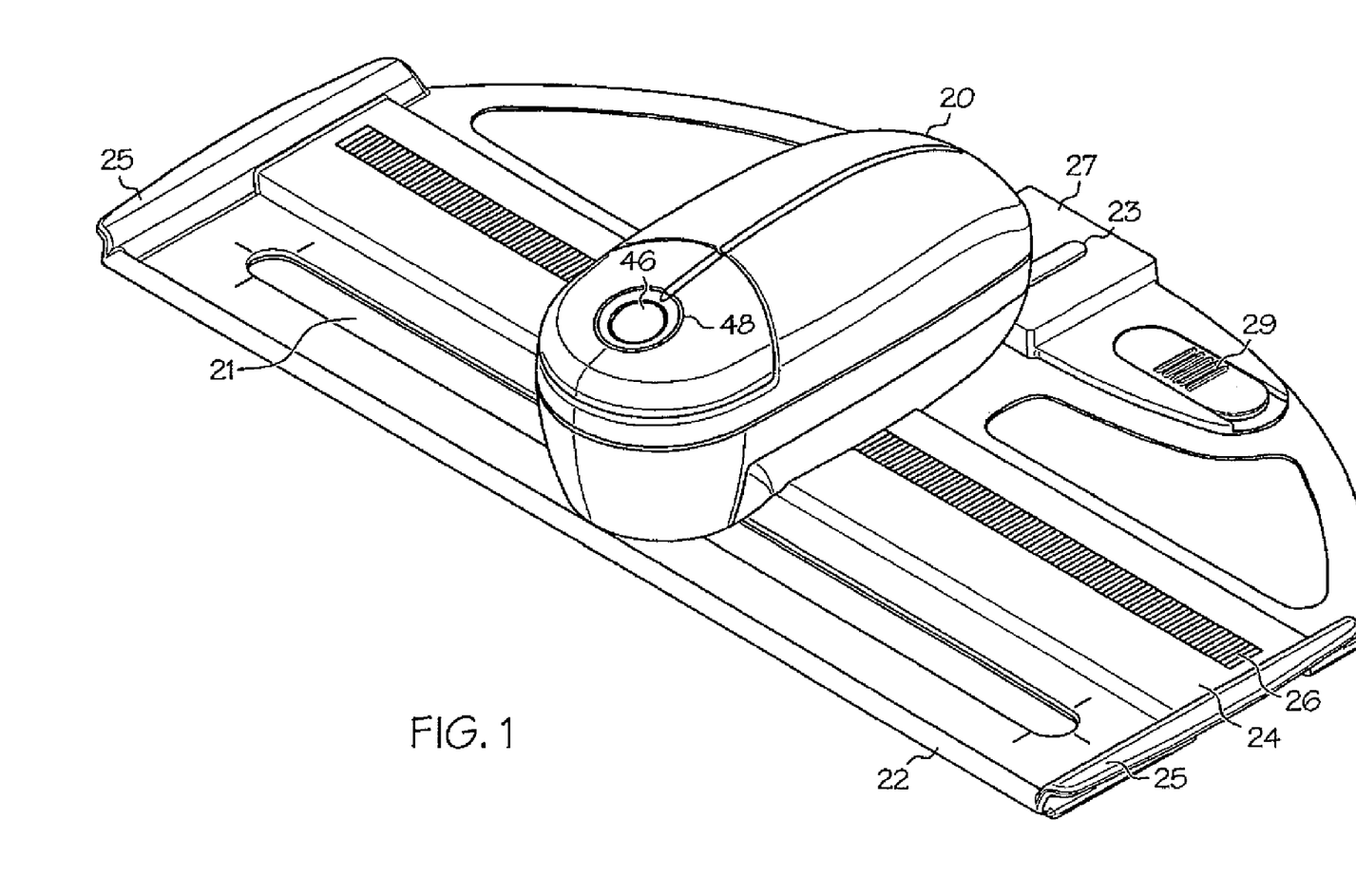
FIG. 1 shows a handheld color measurement instrument in place on a scanning guide.

FIG. 1 shows a handheld color measurement instrument (CMI) 20 in place on scanning guide 22, thereby forming a color measurement apparatus. Scanning guide 22 includes port 21. The detector array of CMI 20 is positioned above scanning guide 22. CMI 20 reads a color chart placed beneath scanning guide 22, through port 21. Scanning guide 22 includes plateau 24. Plateau 24 is arranged to fit within a wide notch located in the base of CMI 20. Plateau 24 includes markings 26. CMI 20 reads markings 26 in order to gauge linear movement of CMI 20.

When CMI 20 is placed onto plateau 24, side stops 25 of scanning guide 22 prohibit motion of CMI 20 outside of the scanning guide.

Figure 1A:
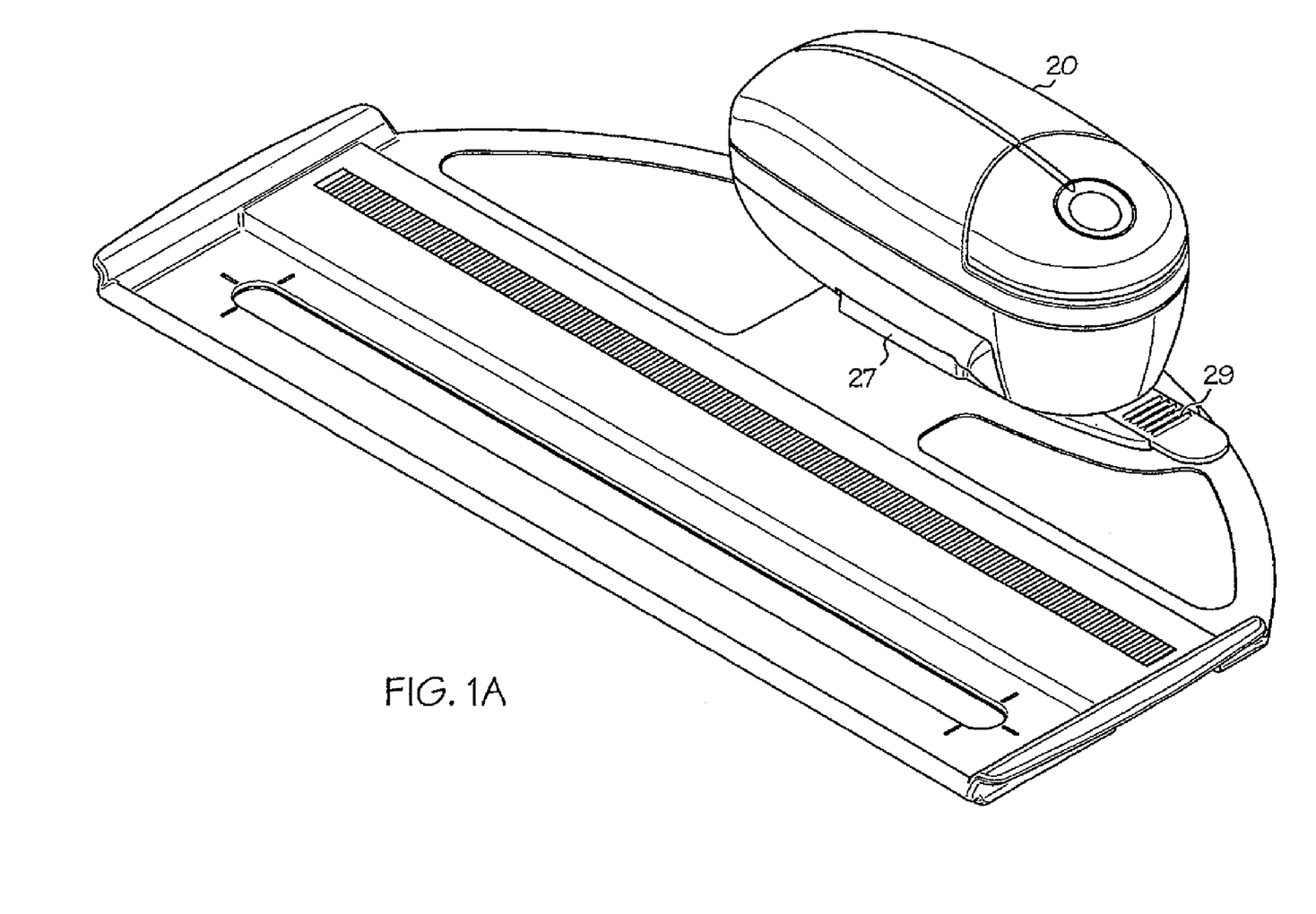
FIG. 1A shows the handheld color measurement instrument measuring a calibration reference.

Scanning guide 22 is also provided with calibration plateau 27 and calibration reference 29. Calibration reference 29 is protected from contamination by a protective cover. Calibration plateau 27 has similar dimensions to plateau 24. As shown in FIG. 1A, notch 28 can be placed over calibration plateau 27 in order to maintain the location of the detector array above calibration reference 29. Calibration plateau 27 also has raised feature 23 to precisely locate CMI 20. Thus, everything necessary to accurately calibrate CMI 20 is located on the scanning guide, thus reducing the possibility of losing essential parts.

Figure 1B:
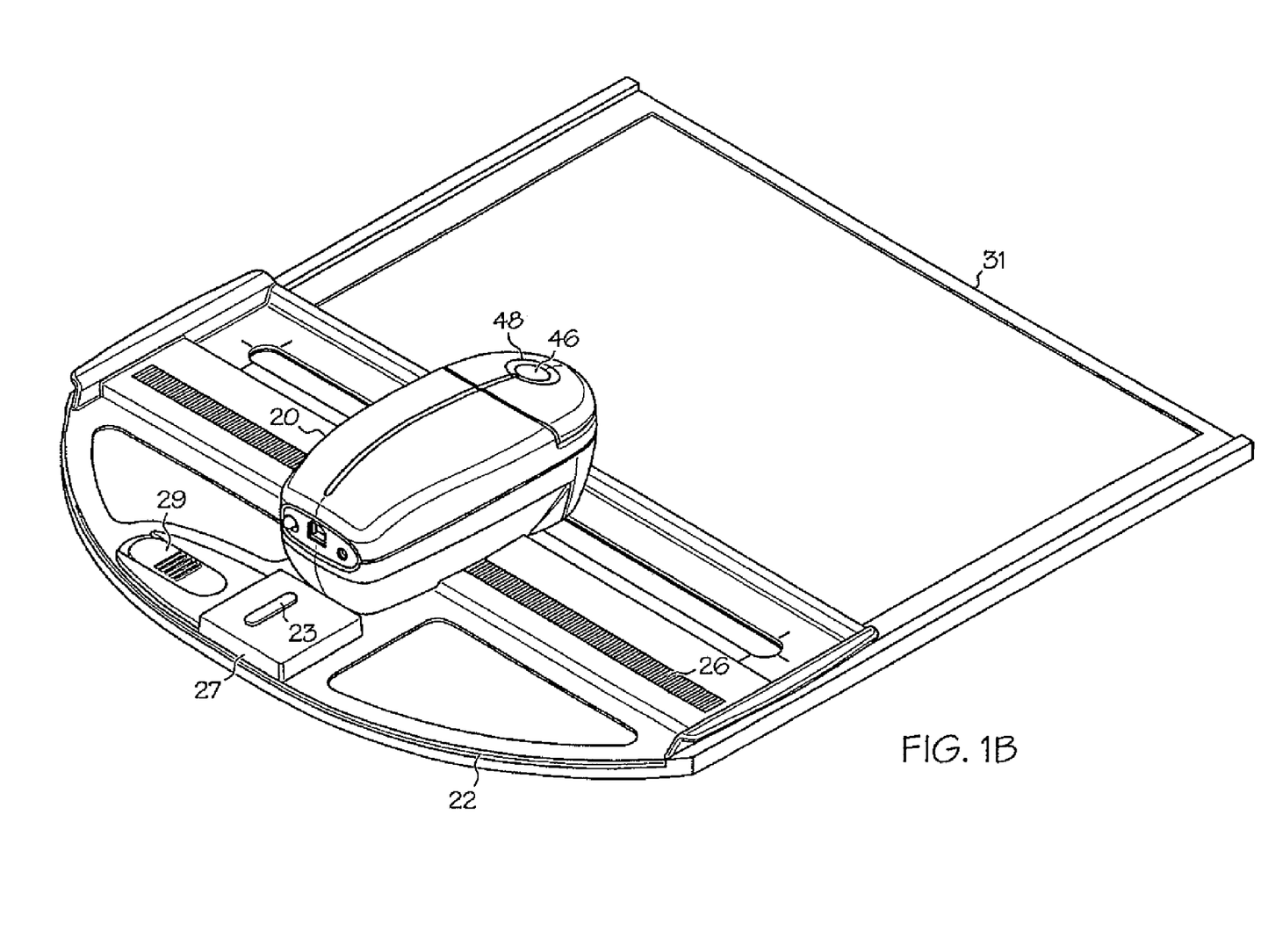
FIG. 1B shows the scanning guide attached to a vertical guide.

FIG. 1B shows scanning guide 22 attached to vertical guide 31. Most color targets are composed of multiple rows of color patches. The color patch has a target color.

By providing vertical guide 31, CMI 20 is maintained in a fixed relation to the color chart, thereby facilitating an accurate reading of the color chart. By novel use of the aligning features of CMI 20 to scanning guide 22, coupled with aligning features of scanning guide 22 to vertical guide 31, single handed operation is facilitated in both X and Y directions over a grid of color patches. X direction motion is monitored by optical detector reading markings 26, while Y direction motion is detected by the reading of encoded information within the row, as will be described with reference to FIG. 6 and FIG. 7.

Figure 2:
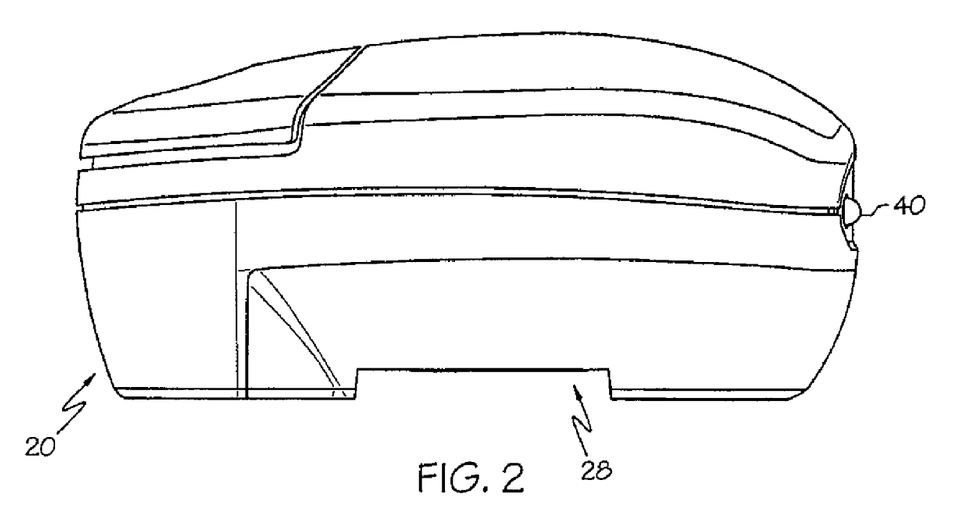
FIG. 2 is a side view of the handheld color measurement instrument.

FIG. 2 is a side view of CMI 20. Notch 28 of CMI 20 is more clearly shown. Due to the interaction of notch 28 with plateau 24, when CMI 20 is moved laterally across scanning guide 22, the patch followed by CMI 20 is generally linear. Thus, even though a person may be using CMI 20 with one hand, CMI 20 will nevertheless proceed in a straight line during the scan.

Figure 3:
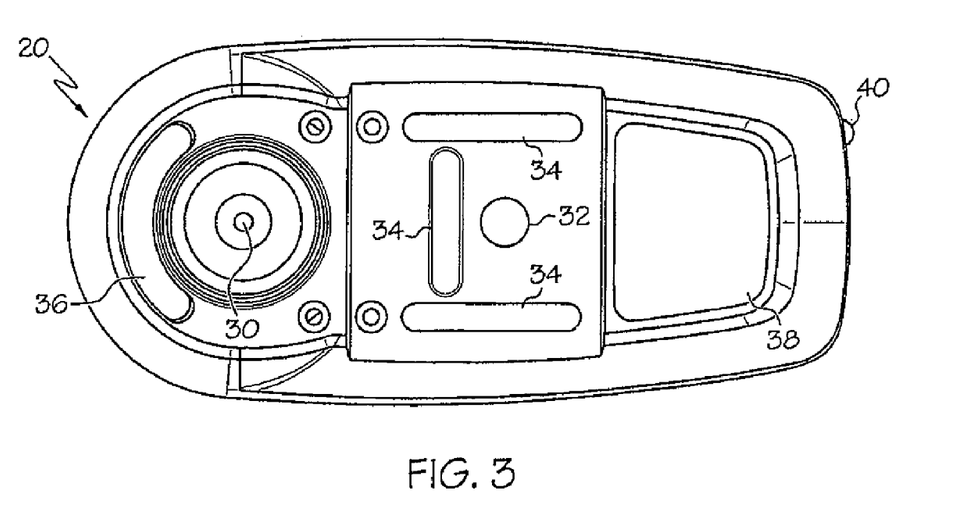
FIG. 3 is a bottom view of the handheld color measurement instrument.

FIG. 3 is a bottom view of CMI 20. The base of CMI 20 consists of three areas. Detector array 30 is housed in the forward portion of CMI 20. Linear feedback sensor 32 is positioned within notch 28 near the center of CMI 20. In order to avoid damage to the target 26, linear feedback sensor 32 is a non-contact linear feedback sensor.

Linear feedback sensor 32 is surrounded by notch glides 34. Notch glides 34 as well as forward glide 36 enable CMI 20 to smoothly transverse scanning guide 22. Rear section 38 of CMI 20 is aligned so that CMI 20 fits snuggly about plateau 24. Slot 34 accommodates raised feature 23 of scanning guide 22 to maintain CMI 20 in position during calibration position.

Figure 4:
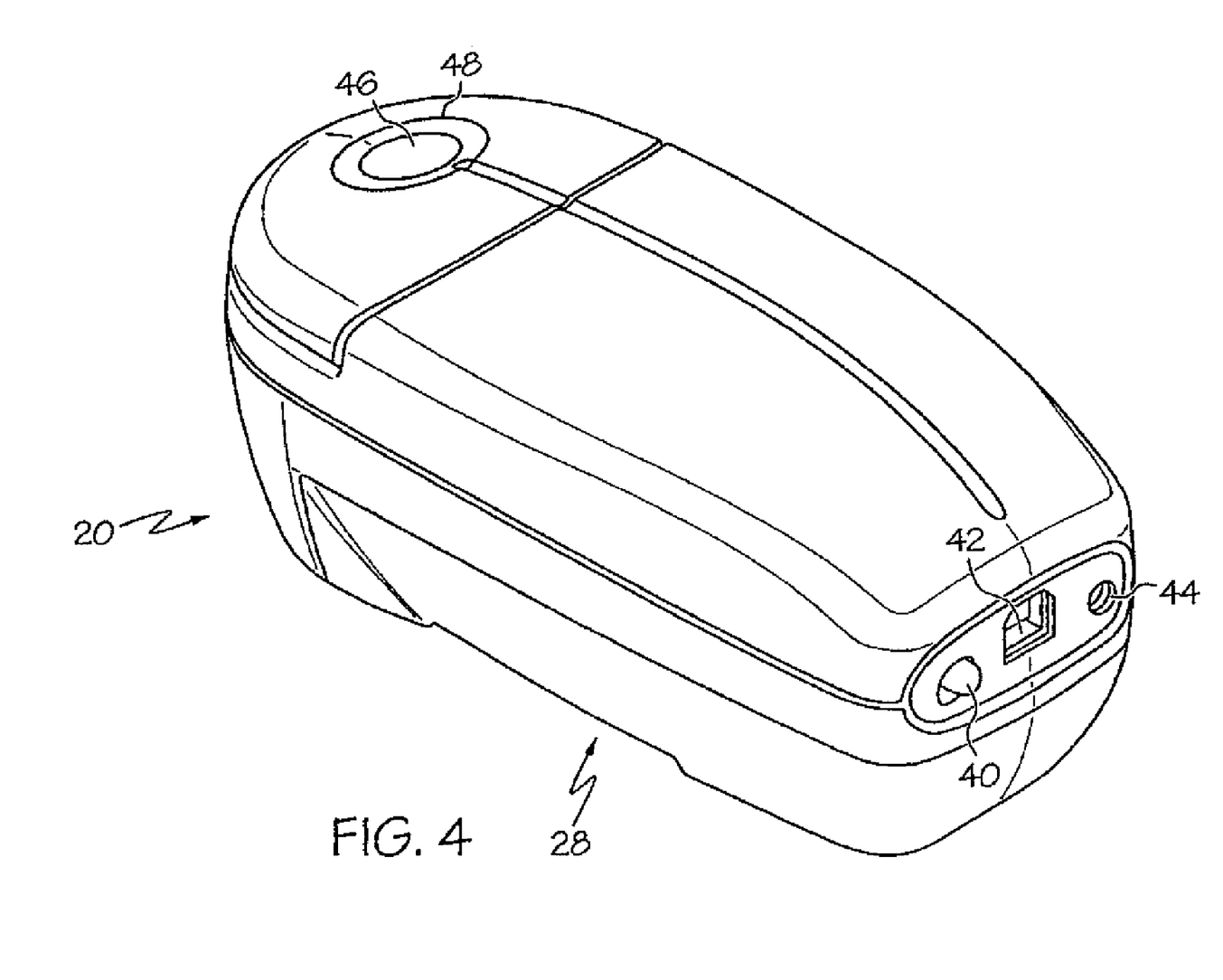
FIG. 4 is perspective view of the end of the handheld color measurement instrument.

FIG. 4 is perspective view of the end of CMI 20. Switch 40 is a toggle switch to change modes of operation of CMI 20. Communication port 42 allows connection of CMI 20 to a computer. Communication port 42 is preferably a USB (Universal Serial Bus) port, but it could also be an IEEE 1394 "firewire" port or any other suitable communication port. Power supply connector 44 allows the use of a conventional power supply as an optional power input.

CMI 20 also includes actuator 46. When actuator surface 46 is depressed, CMI 20 is energized. Actuator 46 includes illumination ring 48.

Referring to FIG. 1, when an instrument is to measure patches in a strip, a color target is placed underneath scanning guide 22. Port 21 is positioned over color bar. CMI 20 is placed over plateau 24, thus automatically aligning detector array 30 over the color bar. Actuator 46 is depressed, and CMI 20 is moved across the color bar, thereby reading the strip of patches. As CMI 20 is moved across the strip, illumination ring 48 changes color or illumination technique, thereby providing immediate feedback to the user of CMI 20 that a reading is being successfully performed. The X-position of CMI 20 is calculated by linear feedback sensor 32.

By accurately maintaining the location of CMI 20 with reference to the color target, the color target is correctly read, allowing an accurate set of patch measurements to be easily and confidently completed. Further, since CMI 20 never contacts the color chart, the color chart is not distorted, thus maintaining the integrity of successive color patches on the color target.

Figure 5:
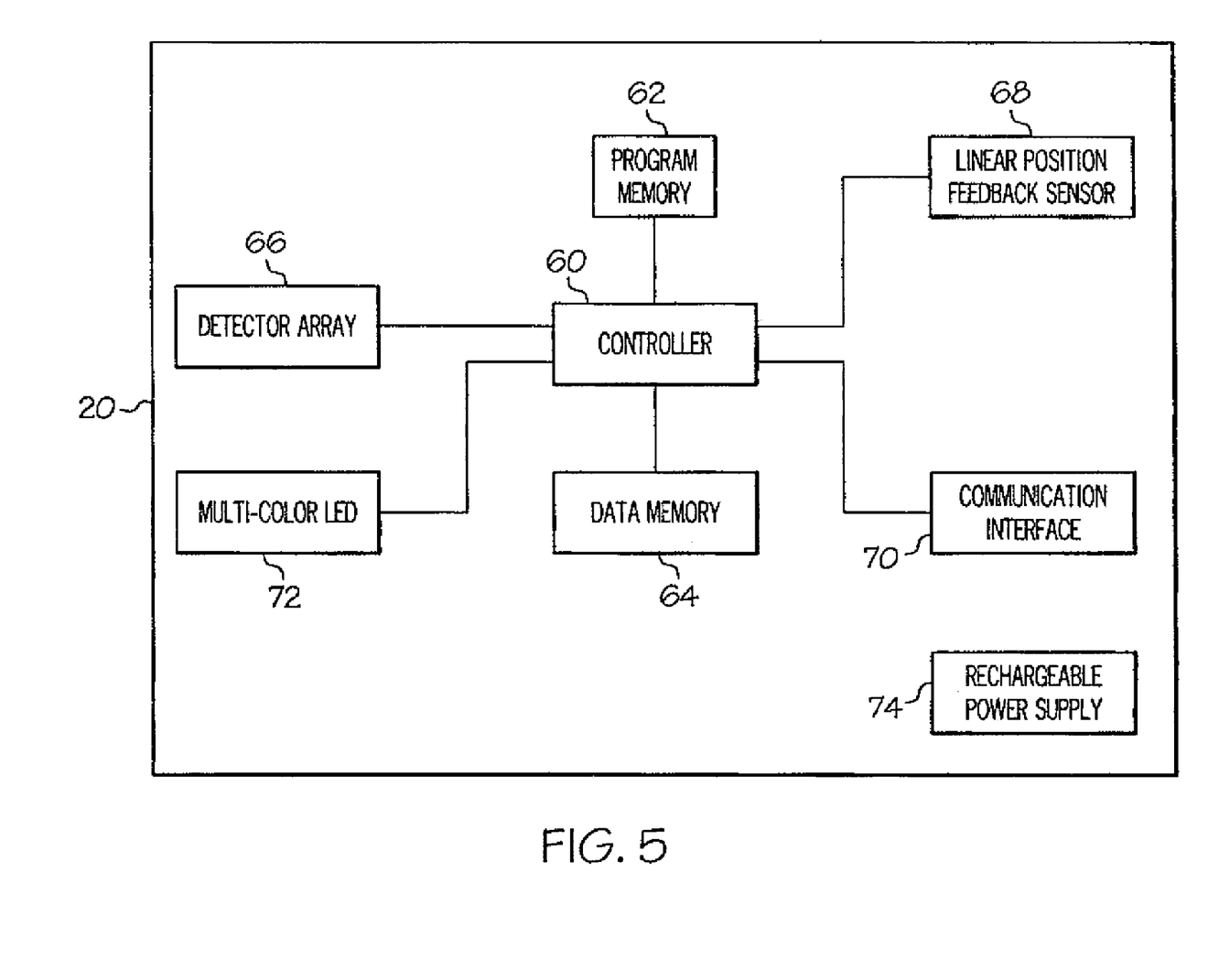
FIG. 5 is a block diagram of the handheld color measurement instrument.

FIG. 5 is a block diagram of CMI 20. CMI 20 includes controller 60. Controller 60 regulates the operation of CMI 20. Controller 60 is coupled to program memory 62 and data memory 64. Program memory 62 contains the instructions executed by controller 60. Controller 60 stores the detector output from detector array 66 in data memory 64.

Detector array 66 could be a known spectrometer or any other device of a size suitable for packaging within a handheld instrument. Further, the spectrometer architecture must have sufficient small size, and be capable of very rapid successive measurements to allow for the scanning motion.

Controller 60 is also coupled to linear position feedback sensor 68. Linear-position feedback sensor 68 could be an Omron EE-SYS125 reflective photomicrosensor. Linear position feedback sensor 68 reads markings 26 in a manner to provide an indication of the distance, rate, and acceleration traversed by CMI 20. The output of linear position feedback sensor 68 is "ticks" which indicate a movement between two markings 26.

Communication interface 70 provides a means for controller 60 to download information from data memory 64 to a remote computer or another memory. As suggested earlier, communication interface 70 could be a conventional USB port. Alternatively, communication interface 70 could be a wireless communication means enabling communication by way of an 802.11b, 802.11g, Blue Tooth protocols, or other advanced wireless protocols.

Illumination ring 48 is a light source using multi-colored LED (light emitting diode) array 72. Each LED generates light of a particular color. LED array 72 could be comprised of one or more commonly available RGB (red-green-blue) LEDs, or it could be comprised of a combination of red LEDs, a green LEDs and blue LEDs as well additional custom color LEDs depending on precision of color rendition effect desired. Controller 60 regulates the output of multi-colored LED array 72.

CMI 20 is powered by power supply 74. Power supply 74 could be a rechargeable power source such as batteries. If power supply 74 were rechargeable batteries, CMI 20 could be provided with a power management system for recharging the rechargeable batteries. If CMI 20 is provided with an internal power supply, CMI 20 could operate without a physical connection to any computer or other power source.

Figure 6:
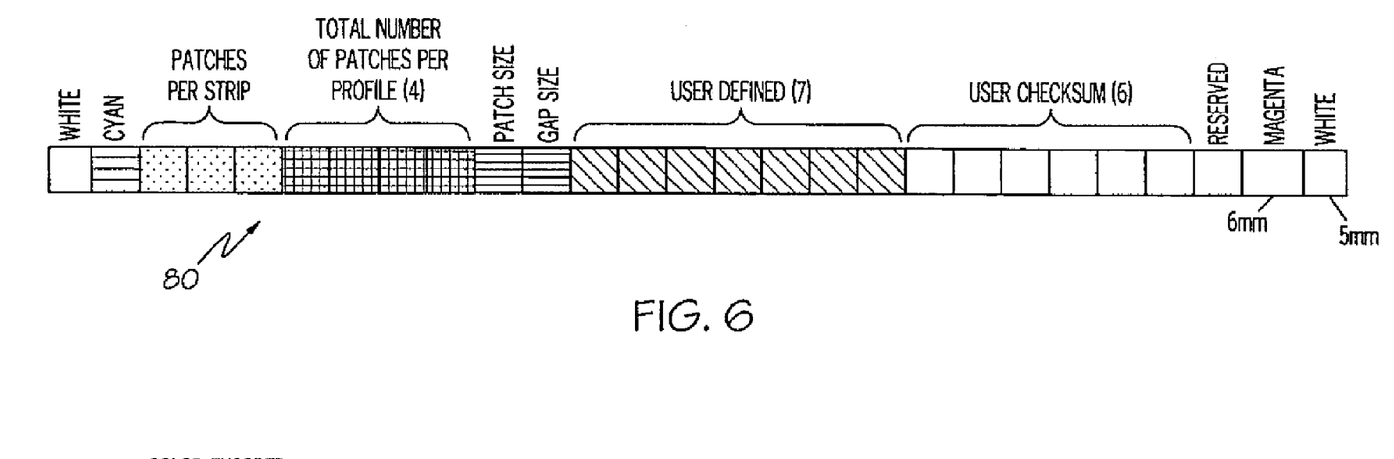
FIG. 6 shows a target identification strip.

In order to more effectively use CMI 20 when operating without a physical connection to a computer, an improved method for ordering color patches in the CMI 20 data memory 64 could encode data regarding the color patches in the color chart. This allows an un-tethered CMI 20 to learn about the entire set of patches a color target contains, before measuring the individual strips of color patches, without benefit of information from an external source such as a computer. The color target definition is contained in the TID strip 80.

FIG. 6 shows a TID (target identification) strip 80. TID strip 80 contains color-encoded information about the color target. The color encoded information is contained within subsets of the strip. Each subset contains one or more color patches. TID strip 80 follows a standardized layout. Although there are many ways TID strip 80 could be configured, one example uses a minimum patch length of about 6 millimeters. One default condition may utilize known start and end spacing or markings so that the CMI 20 is able to recognize the TID strip 80 when scanning from either direction.

The first patch of TID strip 80 is the start bit. Preferably, the patch is printed in cyan. The second through fourth patches define the total number of patches contained in each strip by using a color-encoded value. The fifth through eighth color patches contain the total number of patches for the entire target. The ninth patch is a color-encoded value defining a value of deviation in millimeters from the default 6 millimeter patch size. The tenth patch defines the deviation in millimeters from a default gap size.

The eleventh through seventeenth color patches are for user defined fields. These fields could allow proper coordination in printing facilities where multiple printers are being color management profiled, and coordination for measured color targets could be accommodated with the proper printer device and unique media type.

A checksum in contained within patches eighteen through twenty-three. Patch twenty-four is a reserved field patch. The TID strip 80 terminates with a stop bit. The stop bit is magenta.

Figure 7:
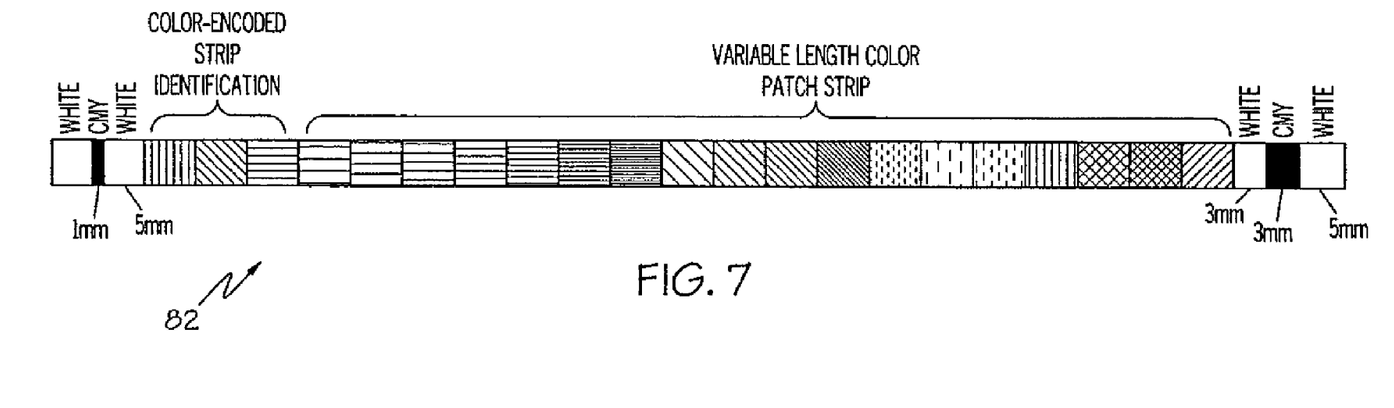
FIG. 7 shows a color strip with a strip identification prefix and postfix.

To further assist CMI 20, each color strip could contain information concerning the color strip. FIG. 7 shows an SID (strip identification color strip) 82.

Like TID 80, SID 82 could have several different formats. One satisfactory layout requires a minimum patch length of six millimeters. SID 82 begins and ends with a minimum five millimeters of white space. The first patch is a start bit using a format of a one-millimeter CMY overprint followed with a five millimeter white patch. Patches two, three and four contain strip identification information. The next series of patch colors contain the actual target measurement strip. SID 82 terminates with a stop bit positioned as the last patch in the strip. The stop bit patch contains a format of three millimeters white followed by a tree millimeter CMY overprint.

Due to the presence of the stop and start color patches, SID 82 can be read in either direction. After SID 82 is read, software is used to determine the correct order of the color patches. Because SID 82 can be read in either direction, the operation of CMI 20 is greatly simplified.

Figure 8:
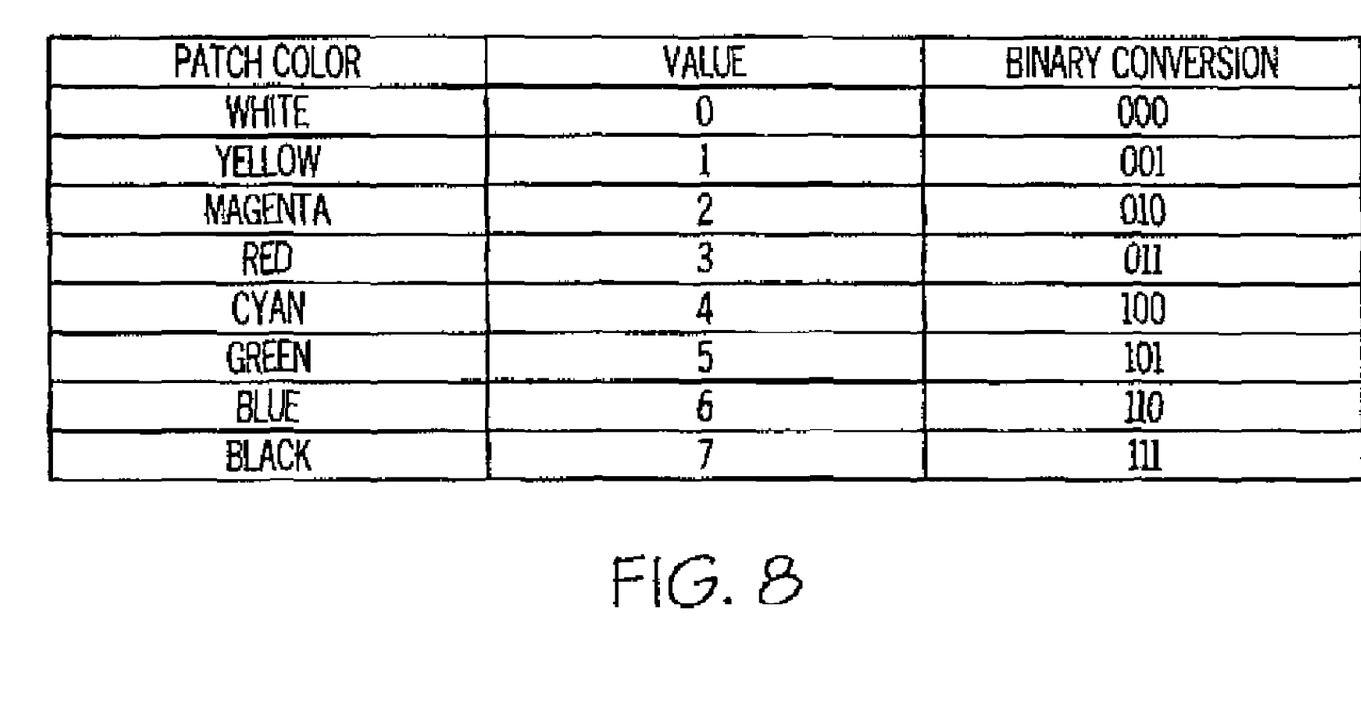
FIG. 8 is a table showing numeric values associated with colors.

FIG. 8 is a table showing numeric values associated with colors for evaluation of TID 80 and SID 82. Other numeric values and color combinations could be used to increase the data density per patch color.

Figure 9:
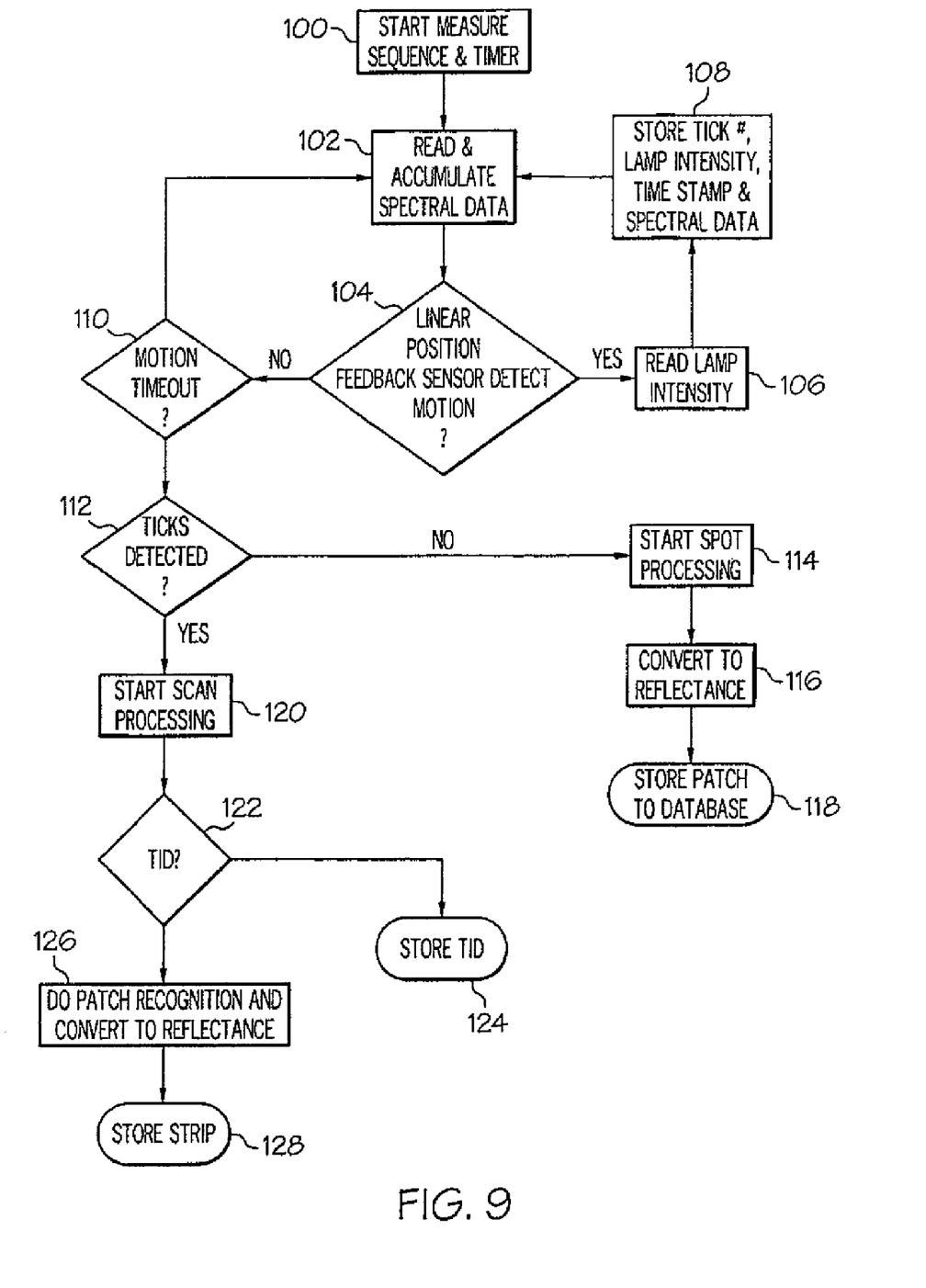
FIG. 9 shows the operation of the handheld color measurement instrument.

FIG. 9 shows the operation of CMI 20. The scanning starts by the initialization of a timer. Step 100. Spectral data is read and accumulated. Step 102. The linear position feedback sensor 68 is checked to determine if motion was detected. Step 104. If so, then the lamp intensity is read. Step 106. The number of ticks, the lamp intensity, a time stamp and the spectral data are stored in data memory 64. Step 108. The process then continues.

On the other hand, if linear position feedback sensor 68 indicates that no motion has occurred, then the timer is checked for a motion timeout Step 110. A motion timeout indicates that movement of CMI 20 has not occurred for a relatively long period of time.

If a motion timeout has not occurred, then spectral data is again read and stored, Step 102. On the other hand, if a motion timeout has occurred, then the number of ticks stored is checked. Step 112. If the number of ticks indicates that little or no movement of CMI 20 has occurred, then the CMI 20 is configured to operate in spot processing mode. Step 114. The spectral data is read and converted into a reflectance, Step 116. The data is stored in data memory 64. Step 118.

If the number of ticks stored indicates that movement has occurred, then scan processing starts. Step 120. If the strip is determined to be a TID (step 122), then the TID is analyzed and stored. Step 124. If the strip is determined not to be a TID, then patch recognition is performed on the strip and the result is converted into reflectances. Step 126. The strip is then stored. Step 128.

Figure 10:
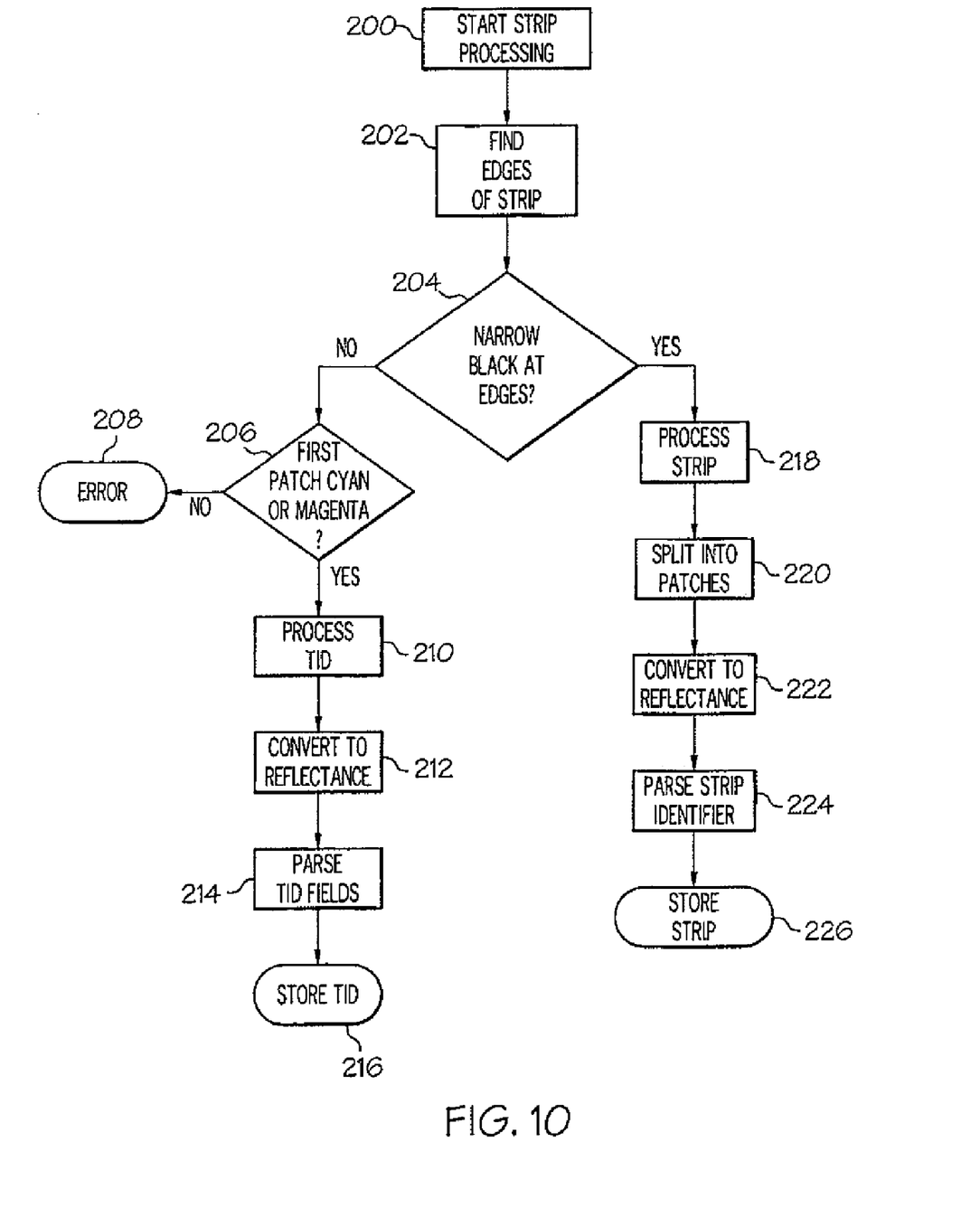
FIG. 10 shows the patch recognition process performed by the handheld color measurement instrument.

FIG. 10 shows the patch recognition process performed by CMI 20. The process starts. Step 200. The edges of the strip are detected. Step 202. The strip is then checked for the existence of narrow black edges. Step 204. The absence of narrow black edges is indicative of a TID strip. If there are no black edges, the first patch is checked. Step 206. If the first patch is not cyan or magenta, then an error has occurred, and the process ends. Step 208.

If, on the other hand, the first patch found is cyan or magenta, then the strip is processed as a TID strip. Step 210. The patches are converted to reflectances. Step 212. The TID is parsed. Step 214. The TID information is then stored. Step 216.

If black edges were detected, then the strip is processed. Step 218. The strip is split into patches (step 220) and the patches are converted to reflectances (step 222). The strip identifier is then parsed. Step 224. The strip is then stored. Step 226.

Figure 11:
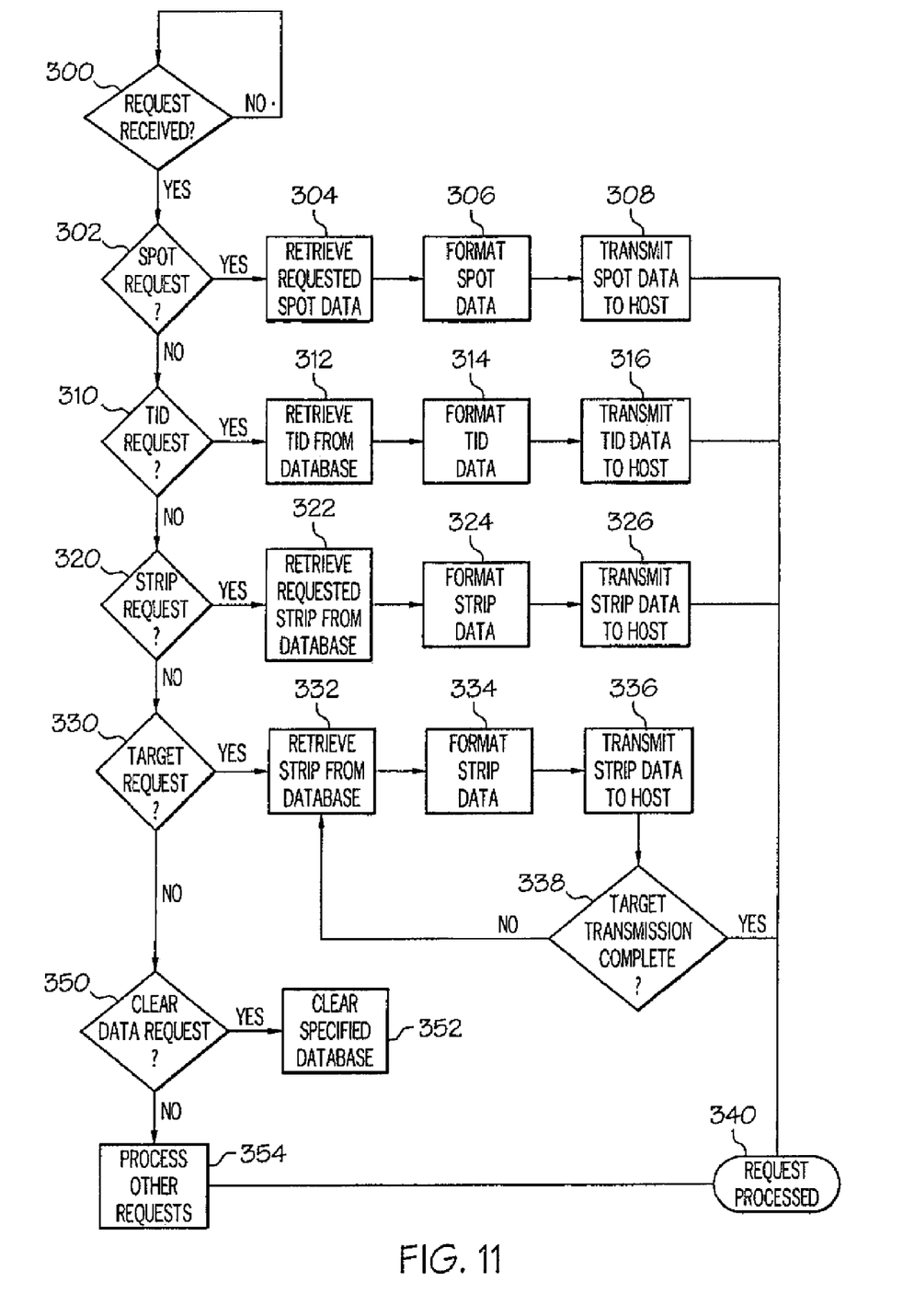
FIG. 11 shows the process for data management for the handheld color measurement instrument.

FIG. 11 shows the process for data management. As indicated previously, communication interface 70 could be a USB connection, an IEEE firewire connection, or a wireless connection Further, CMI 20 need not be continuously in communication with a host computer. For example, if CMI 20 were provided with a battery as well as a USB connection port, CMI 20 could read a color chart and then download the information obtained from reading the chart to a computer whenever a communication link was established between CMI 20 and the computer. Thus, a method must be provided to transfer the data from CMI 20 to the computer. One such method is shown in FIG. 11.

CMI 20 waits for a request from a computer. Step 300. If no request is received, CMI 20 continues to wait. If a request is received, the type of request is parsed.

If the request is for a spot (step 302), then the requested spot data is retrieved. Step 304. The spot data is formatted (step 308) and then transmitted to the computer. Step 306. If the request is for TID information (step 310), then the TID is retrieved from the database (step 312), formatted (step 314) and then transmitted (step 316). If the request is for a strip (step 320), then the strip data is retrieved from the memory (step 322), formatted (step 324) and then transmitted (step 326).

If the request is for target information (step 330), then one strip is retrieved from memory (step 332), formatted (step 334) and transmitted (step 336). After transmission of the strip, CMI 20 determines whether all of the strip data for the target has been sent. Step 338. If not, the process repeats. If it has, then the request has processed. Step 340.

If the request was a clear data request (step 350), the memory is cleared (step 352). Otherwise, the other requests are processed. Step 354.

As indicated previously, CMI 20 is provided with illumination ring 48. Illumination ring 48 can be used to provide information to the user of CMI 20 regarding the operation of CMI 20. For example, illumination ring 48 can provide information regarding the status of an operation as well as the mode of an operation. Illumination ring 48 would display a particular color, such as red, if a reading by CMI 20 failed, and a different color, such as green, when it succeeded. Illumination ring 48 also provides a different color for each mode of operation. A different color would be displayed if CMI 20 were operating in a normal mode or a calibration mode. Further, illumination ring 48 can provide visual feedback to the user of the color being measured by CMI 20 or indication of the mode of operation. The CMI 20 can perform multiple patch reading or individual single patch reading functions, and the illumination ring 48 may be illuminated with custom user feedback illumination techniques. That is, if CMI 20 is reading a color patch that is red, then illumination ring 48 becomes red. If CMI 20 is reading a color patch that is green, then illumination ring 48 becomes green. In this way, a user of CMI 20 is provided visual feedback that CMI 20 is operating.

Figure 12:
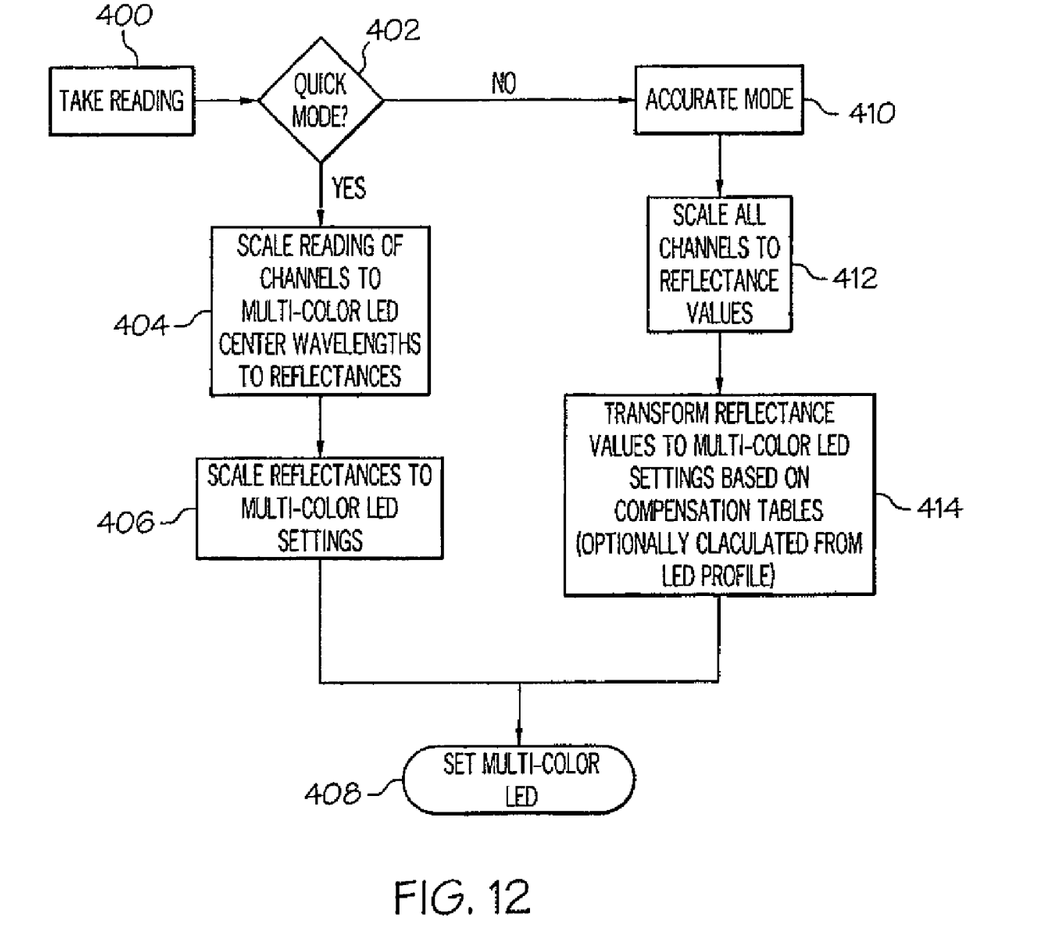
FIG. 12 shows the process for operation of an illumination ring.

FIG. 12 shows the process for operation of illumination ring 48 if illumination ring 48 is comprised of one or more multi-colored LEDs. Illumination ring 48 can operate in either fast mode or accurate mode. Fast mode provides for a more rapid display of colors on illumination ring 48, while accurate mode provides for a more accurate rendering of colors on illumination ring 48.

A reading is taken. Step 400. If operating in quick mode (step 402), the reading of channels is scaled to the center wavelengths of the multi-colored LEDs. Step 404. The reflectances are then scaled to multi-color LED settings. Step 406. The multi-colored LEDs are then illuminated at the settings. Step 408.

If operating in accurate mode (step 410), all channels are scaled to reflectance values. Step 412. The reflectance values are transformed to multi-color LED settings based on compensation tables, which could be optionally calculated from an LED profile. Step 414. The multi-colored LEDs are then set. Step 408.

Figure 13:
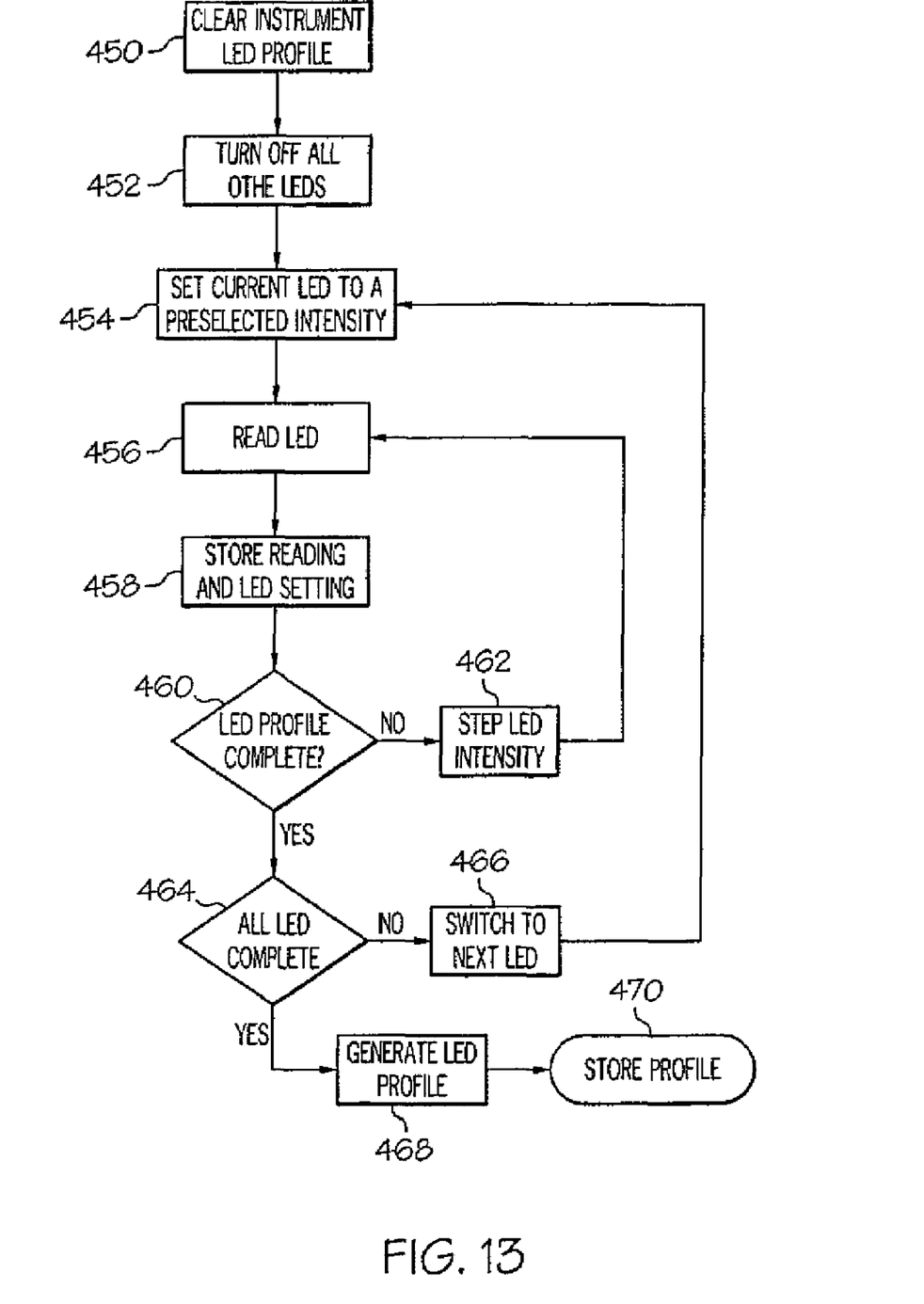
FIG. 13 shows a method for creating the color profile for the illumination ring.

The LED profile referred to in step 414 is a color profile for the illumination ring 48. Since illumination ring 48 is a display device, a color profile will enhance the color display capabilities of illumination ring 48. FIG. 13 shows a method for creating the color profile for illumination ring 48. Since illumination ring 48 is comprised of multi-colored LEDs, a profile for each LED is created. The CID 20 is used for making a color management profile for a device such as a printer. The CID contains a color emitting illumination ring 48 which can also benefit from generating a color management profile for each individual CID 20 for proper illumination ring 48 color rendition in a linearized or calibrated way as well as color profiled for the entire of color gamut produced by the illumination ring, much like making ad color management profile for each individual host computer display monitor. It is envisioned that other display technology, such as LED backlit graphical displays on a Color Measurement Instrument, could benefit from this new technique as integrated into an untethered capable Color Measurement device.

First, the LED profile is cleared. Step 450. Any other LEDs are turned off Step 452. The current LED is set to a predetermined intensity. Step 454. The LED is read. Step 456. The reading and setting for the LED is stored in memory. Step 458. If the profile for the current LED is not complete (step 460), the LED intensity is stepped. Step 462.

If the profile for the current LED is complete (step 460), then the system determines if all of the LEDs have been measured. Step 464. If not, the next LED is checked (step 466), and the process repeats. If all LEDs have been measured, then a LED profile is generated (step 468) and the LED profile is stored in memory (step 470).

The above description is of the preferred embodiment. Various alterations and changes can be made without departing from the spirit and broader aspects of the invention as defined in the appended claims, which are to be interpreted in accordance with the principles of patent law including the doctrine of equivalents. Any references to claim elements in the singular, for example, using the articles "a," "an," "the," or "said," is not to be construed as limiting the element to the singular.

The embodiments of the invention in which an exclusive property or privilege is claimed are defined as follows:

1. A method of operating a color measurement instrument comprising:
   scanning a plurality of color targets in at least one scan direction, the color targets arranged in a sequence; and
   determining the sequence independently of the at least one scan direction.

2. The method of claim 1 further comprising: detecting a first sequence indicator indicating movement in a first direction.

3. The method of claim 2 further comprising: detecting a second sequence indicator indicating movement in a second direction.

4. The method of 3 further comprising: detecting a third sequence indicator indicating movement in the first direction.

5. The method of claim 4 where the first direction is orthogonal to the second direction.

6. The method of claim 5 where the scanning of the plurality of targets creates a scan, further comprising: counting the plurality of targets in the scan to create a count.

7. The method of claim 6 further comprising: determining a location of a first color target in the plurality of color targets from the count.

8. The method of claim 1, wherein the color measurement instrument is a spectrophotometer.

9. The method of claim 8, wherein the spectrophotometer is a handheld spectrophotometer.

10. The method of claim 1, wherein the color measurement instrument is in communication with a computer.

11. The method of claim 10, wherein the color measurement instrument communicates with the computer by way of a wired or a wireless communication interface.

12. The method of claim 1, wherein the color targets are arranged in a standardized layout.

13. The method of claim 12, wherein the standardized layout includes standardized start and end spacings or standardized start and end markings.

14. The method of claim 13, further comprising: identifying an error if the standardized start spacing or standardized start marking is not read by the color measurement instrument.

* * * * *